US012707187B2

(12) United States Patent
Chen et al.

(10) Patent No.: US 12,707,187 B2
(45) Date of Patent: Aug. 11, 2026

(54) EARPHONE AND AUDIO PROCESSING METHOD AND APPARATUS THEREFOR, AND STORAGE MEDIUM

(71) Applicant: GOERTEK TECHNOLOGY CO., LTD., Qingdao (CN)

(72) Inventors: Qiang Chen, Qingdao (CN); Songyang Li, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 159 days.

(21) Appl. No.: 18/579,535

(22) PCT Filed: Dec. 16, 2021

(86) PCT No.: PCT/CN2021/138812

§ 371 (c)(1),
(2) Date: Jan. 16, 2024

(87) PCT Pub. No.: WO2023/000602

PCT Pub. Date: Jan. 26, 2023

(65) Prior Publication Data

US 2024/0323586 A1 Sep. 26, 2024

(30) Foreign Application Priority Data

Jul. 19, 2021 (CN) ........................ 202110813086.X

(51) Int. Cl.
*H04R 1/10* (2026.01)
*G10K 11/178* (2006.01)

(52) U.S. Cl.
CPC ..... *H04R 1/1091* (2013.01); *G10K 11/17854* (2018.01); *G10K 2210/3038* (2013.01); *H04R 2460/01* (2013.01); *H04R 2460/13* (2013.01)

(58) Field of Classification Search
CPC .............. H04R 1/1091; H04R 2460/01; G10K 11/17854
See application file for complete search history.

(56) References Cited

U.S. PATENT DOCUMENTS

2021/0185465 A1* 6/2021 Bramsløw ............ H04R 25/554

FOREIGN PATENT DOCUMENTS

CN 106888414 A * 6/2017 ........... H04R 1/1091
CN 110087162 A 8/2019
(Continued)

OTHER PUBLICATIONS

International Search Report from International Application No. PCT/CN2021/138812 mailed Mar. 9, 2022.

*Primary Examiner* — Devona E Faulk
(74) *Attorney, Agent, or Firm* — Shih IP Law Group, PLLC.

(57) ABSTRACT

Disclosed in the present disclosure are an earphone and an audio processing method and apparatus therefor, and a storage medium. The audio processing method comprises: acquiring a bone conduction signal and a microphone signal when the earphones are in worn states; performing phase adjustment on the bone conduction signal to obtain an adjusted bone conduction signal; and inputting an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons.

8 Claims, 6 Drawing Sheets

(56) References Cited

FOREIGN PATENT DOCUMENTS

| | | | | | |
|---|---|---|---|---|---|
| CN | 111447523 | A | | 7/2020 | |
| CN | 111935573 | A | | 11/2020 | |
| CN | 212970064 | U | | 4/2021 | |
| CN | 112822585 | A | | 5/2021 | |
| CN | 113395629 | A | | 9/2021 | |
| WO | 2009102811 | A1 | | 8/2009 | |
| WO | WO-2010052720 | A1 | * | 5/2010 | ............... H04R 3/04 |
| WO | WO-2012069966 | A1 | * | 5/2012 | ......... G10L 21/0208 |
| WO | 2016129717 | A1 | | 8/2016 | |
| WO | WO-2020248113 | A1 | * | 12/2020 | ............. H04R 25/00 |
| WO | 2021135329 | A1 | | 7/2021 | |

* cited by examiner

EARPHONE AND AUDIO PROCESSING METHOD AND APPARATUS THEREFOR, AND STORAGE MEDIUM

The present disclosure claims the priority to the Chinese Patent Application No. 202110813086.X, entitled "EARPHONES AND AUDIO PROCESSING METHOD AND APPARATUS THEREFOR, AND STORAGE MEDIUM" filed with China Patent Office on Jul. 19, 2021, the entire contents of which are incorporated into the present disclosure by reference.

TECHNICAL FIELD

The present disclosure relates to a technical field of earphones, and more particularly, to an earphone and an audio processing method and apparatus therefor, and a storage medium.

DESCRIPTION OF RELATED ART

With the continuous development of science and technology, earphones are increasingly used in people's daily lives. When people speak, the sound of speech can be transmitted into their ear canals through bone conduction and air conduction. When a user wears earphones to speak, a space in the ear canal becomes smaller due to the plugging of the earphones into the ear canal, which increases a self-voice gain transmitted to the user's ear canal through bone conduction. Therefore, when the user speaks while wearing earphones, there may be a situation where the obtained self-voice is too loud to clearly hear the surrounding environmental sounds.

In particular, some users who have suffered hearing loss from working in high-intensity noise environments for a long time often choose to use assistive listening earphones to compensate for the hearing loss problem. For example, as shown in FIG. 1, in conventional assistive listening earphones, microphone (MIC) is usually used to collect external audio signals based on air conduction. Since an object from which the sound originates cannot be recognized, the assistive listening earphones will uniformly amplify the collected sounds by using the assistive listening algorithm, as a result, when using assistive listening earphones, the hearing-impaired users may not only receive the self-voice collected and amplified by the assistive listening earphones, but also cause an increase in the self-voice gain transmitted to the user's ear canal through bone conduction due to the insertion of assistive listening earphones into the ear canal, thereby seriously affecting the user's using experience. In view of the above, there is a problem in the prior art that when a user wears earphones to speak, the volume of the self-voice transmitted to the ear canal through a user's skeletons is too high.

SUMMARY

In view of this, a purpose of the present disclosure is to provide earphones and an audio processing method and apparatus therefor, and a storage medium, which can effectively weaken the sound transmitted to an ear canal through a user's skeletons, and improve the use's experience. The technical solutions are as follows.

A first aspect of the present disclosure provides an audio processing method for earphones, including:

acquiring a bone conduction signal and a microphone signal when the earphones are in worn states;

performing phase adjustment on the bone conduction signal to obtain an adjusted bone conduction signal; and inputting an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons.

Optionally, the acquiring a bone conduction signal of earphones when earphones are in worn states includes:

collecting a bone conduction signal when the earphones are in worn states by a bone conduction sensor;

performing noise reduction processing on the bone conduction signal collected by the bone conduction sensor to obtain the noise-reduced bone conduction signal;

correspondingly, the performing phase adjustment on the bone conduction signal includes:

performing phase adjustment on the noise-reduced bone conduction signal.

Optionally, the performing noise reduction processing on the bone conduction signal collected by the bone conduction sensor includes:

acquiring a trained neural network adaptive filter through a cloud server; and performing filtering processing on the bone conduction signal collected by the bone conduction sensor by using the trained neural network adaptive filter to reduce a self-voice component transmitted through air in the bone conduction signal.

Optionally, training the neural network adaptive filter includes:

acquiring a training set, the training set includes a pre-collected microphone signal and a corresponding bone conduction signal before noise reduction and a bone conduction signal after noise reduction, the bone conduction signal before noise reduction is a bone conduction signal collected by the bone conduction sensor, and the bone conduction signal after noise reduction is a bone conduction signal obtained by reducing the self-voice component transmitted through air in the bone conduction signal before noise reduction; and training the neural network adaptive filter by using the microphone signal and the bone conduction signal before noise reduction in the training set as input side training data and using the bone conduction signal after noise reduction in the training set as output side training data, to obtain the trained neural network adaptive filter.

Optionally, the acquiring a bone conduction signal when the earphones are in worn states includes:

collecting a bone conduction signal when the earphones are in worn states by a bone conduction sensor;

correspondingly, the performing phase adjustment on the bone conduction signal includes:

directly performing phase adjustment on the bone conduction signal collected by the bone conduction sensor.

Optionally, the performing phase adjustment on the bone conduction signal to obtain an adjusted bone conduction signal comprises:

performing reversing phase processing on the bone conduction signal to obtain an adjusted bone conduction signal.

Optionally, before the inputting an audio stream, which contains the adjusted bone conduction signal and the microphone signal, into an audio playing unit of the earphones to play the audio stream, the method further comprises:

processing the audio stream based on a hearing impairment compensation algorithm and/or a speech enhancement algorithm.

A second aspect of the present disclosure provides an audio processing apparatus for earphones, comprising:

a signal acquisition module for acquiring a bone conduction signal and a microphone signal when the earphones are in worn states;

a phase adjustment module for performing phase adjustment on the bone conduction signal to obtain an adjusted bone conduction signal; and an audio playback module for inputting an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons.

A third aspect of the present disclosure provides earphones, comprising a processor and a memory, wherein the memory is used to store a computer program, and the computer program is loaded and executed by the processor to implement the afore-mentioned audio processing method for earphones.

A fourth aspect of the present disclosure provides a computer-readable storage medium, for storing a computer-executable instruction, wherein when the computer-executable instruction is loaded and executed by a processor, the afore-mentioned audio processing method for earphones is implemented.

The present disclosure is configured to acquire a bone conduction signal and a microphone signal when the earphones are in worn states at first, then perform phase adjustment on the bone conduction signal to obtain an adjusted bone conduction signal, and finally input an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons. By playing an audio stream containing the adjusted bone conduction signal, co-channel interference is generated in the ear canal of the user between the adjusted bone conduction signal and a sound which is transmitted to an ear canal through a user's skeletons due to the same frequency and a certain phase difference between the adjusted bone conduction signal and the sound, as a result, reducing the sound transmitted to the ear canal through a user's skeletons in the ear canal of the user, thereby improving the user's using experience.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely embodiments of the present disclosure, and for those of ordinary skill in the art, other drawings can also be obtained from the provided drawings without any creative effort.

DETAILED DESCRIPTIONS

Technical solutions of embodiments of the present disclosure will be described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

In the prior art, assistive listening earphones use microphones to collect external audio signals based on air conduction, and since an object from which the sound originates cannot be recognized, the assistive listening earphones uniformly amplify the collected sounds, as a result, when using assistive listening earphones, the hearing-impaired users may not only receive the self-voice collected and amplified by the assistive listening earphones, but also cause an increase in the self-voice gain transmitted to the user's ear canal through skeleton due to the insertion of assistive listening earphones into the ear canal, thereby seriously affecting the user's using experience. To this end, the present disclosure provides an audio processing solution for earphones, which can effectively weaken the sound transmitted to the ear canal through the user's skeletons, thereby improving the user's experience.

Figure 1:
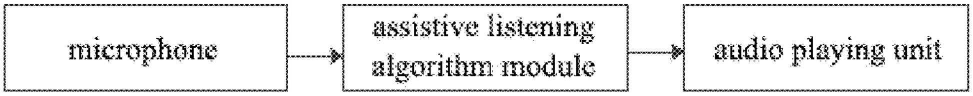
FIG. 1 is a schematic diagram of a conventional audio processing method for assistive listening earphones.
Figure 2:
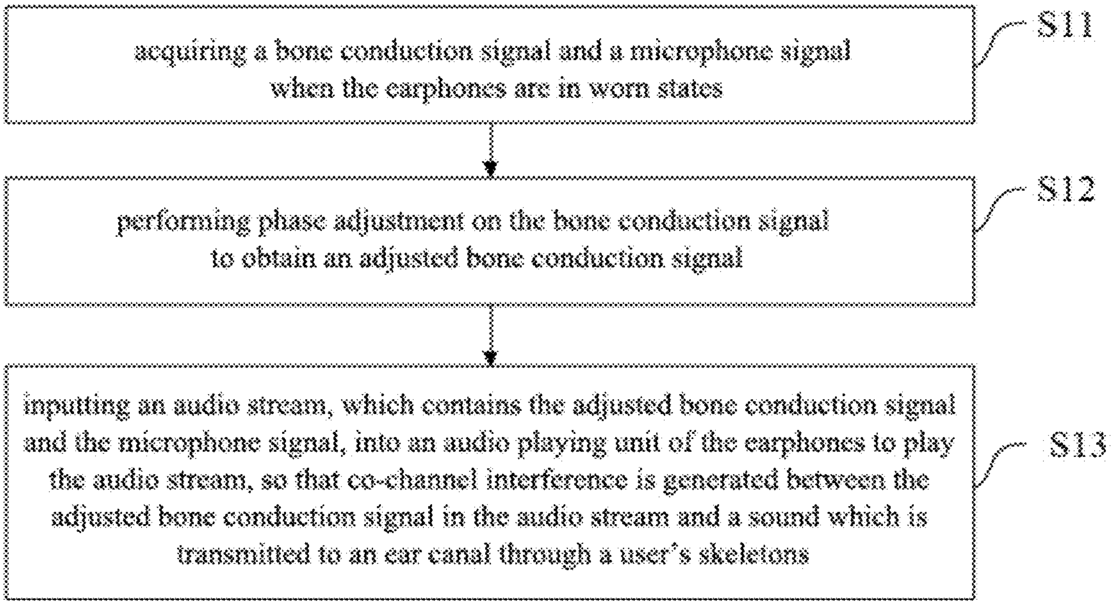
FIG. 2 is a flow chart of audio processing method for earphones provided by the present disclosure.

FIG. 2 is a flow chart of audio processing method for earphones provided by the present disclosure. Referring to FIG. 2, the audio processing method for earphones includes:

S11: acquiring a bone conduction signal and a microphone signal when the earphones are in worn states.

In the embodiment, a bone conduction signal and a microphone signal generated due to the user speaking are acquired when the earphones are in worn states. It will be understood that, when the user speaks, the voice spoken by the user can be transmitted through teeth, gums, and skeleton such as upper and lower jaw bones, and then a corresponding bone conduction signal is collected by a bone conduction sensor in the earphone worn on the user's auricle. In the embodiment, the bone conduction signal can be collected by a voice pickup unit (i.e., VPU) including a bone conduction sensor and provided in the earphone, and the microphone signal can be collected based on air conduction by a microphone provided on the earphone. It will be understood that the microphone signal includes a self-voice component transmitted through air and an external environmental sound component.

S12: performing phase adjustment on the bone conduction signal to obtain an adjusted bone conduction signal.

In this embodiment, a frequency of the bone conduction signal is the same as that of the sound transmitted to the ear canal through the user's skeletons. Accordingly, based on the principle of co-frequency interference, when there is a certain phase difference between the bone conduction signal and a sound transmitted to the ear canal through the user's skeletons, the two signals may produce co-frequency interference. Therefore, it is necessary to perform phase adjustment on the bone conduction signal so that a phase difference between the adjusted bone conduction signal and a sound transmitted to the ear canal through the user's skeletons is a preset phase difference. It will be understood that, co-frequency interference may be produced when there is a certain phase difference between the bone conduction signal and a sound transmitted to the ear canal through the user's skeletons. However, in practical applications, in order to simplify the processing process and improve the co-frequency interference effect, it is usually adopted to perform reversing phase processing on the bone conduction signal. There are many methods for adjusting the phase of the bone conduction signal. For example, an inverter may be used to invert the phase of the bone conduction signal, or an all-pass filter may be used to adjust the phase of the bone conduction signal.

S13: inputting an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons.

When the earphones, especially assistive listening earphones, are in worn states, due to a narrow space of the ear canal, a self-voice gain transmitted to the ear canal through a user's skeletons when the user speaks increases. The assistive listening earphone may amplify all the sound collected by the microphone, and thus the volume of the self-voice superimposed in the user's ear canal may be larger, making it impossible for the user to clearly hear the surrounding environmental sounds. In order to weaken the self-voice transmitted to the ear canal through a user's skeletons, an audio stream including the adjusted bone conduction signal and the microphone signal can be input to an audio playing unit of the earphones to play the audio stream. Since there is a certain phase difference between the adjusted bone conduction signal and a sound transmitted to the ear canal through a user's skeletons, the two signals may produce co-frequency interference in the user's ear canal, which can weaken or even eliminate the self-voice transmitted to the ear canal through a user's skeletons, so that the user can better hear environmental sounds, and thereby improving the user's using experience. It will be understood that the audio playing unit is specifically a loudspeaker provided on the earphones.

In the embodiment, in order to meet the usage needs of hearing-impaired people, it can be configured such that, before inputting an audio stream, which contains the adjusted bone conduction signal and the microphone signal, into an audio playing unit of the earphones to play the audio stream, processing the audio stream based on a hearing impairment compensation algorithm and/or a speech enhancement algorithm, so that hearing-impaired people can have a better experience when using earphones.

It can be seen that, according to the embodiment of the present disclosure, it is configured to acquire a bone conduction signal and a microphone signal at a state that the earphones are worn at first, then perform phase adjustment on the bone conduction signal to obtain an adjusted bone conduction signal, and finally input an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons. The audio stream can also be processed by using a hearing impairment compensation algorithm and/or a speech enhancement algorithm while the hearing-impaired people use the earphones. In this embodiment, by playing an audio stream containing an adjusted bone conduction signal, co-channel interference is generated in the ear canal of the user between the adjusted bone conduction signal and a sound which is transmitted to an ear canal through a user's skeletons due to the same frequency and a certain phase difference between the adjusted bone conduction signal and the sound, as a result, reducing the sound transmitted to the ear canal through a user's skeletons in the ear canal of the user, thereby improving the user's using experience.

Figure 3:
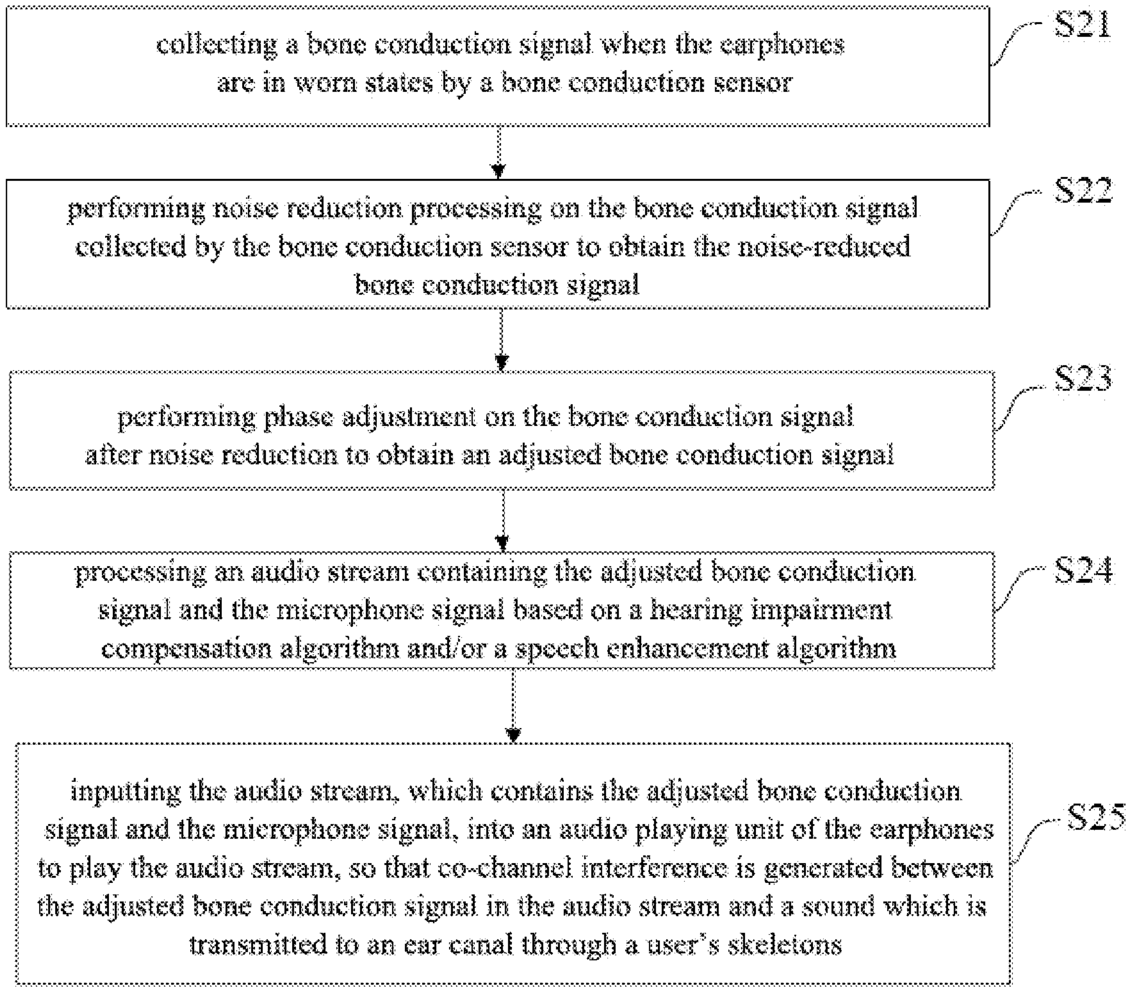
FIG. 3 is a flow chart of a specific audio processing method for earphones provided by the present disclosure.

FIG. 3 is a flow chart of a specific audio processing method for earphones provided by the embodiment of the present disclosure. Referring to FIG. 3, the audio processing method for earphones includes:

S21: collecting a bone conduction signal when the earphones are in worn states by a bone conduction sensor.

In the embodiment, regarding the specific process of the above-mentioned step S21, reference may be made to the corresponding content disclosed in the foregoing embodiments, which will not be described again here.

S22: performing noise reduction processing on the bone conduction signal collected by the bone conduction sensor to obtain the noise-reduced bone conduction signal.

In the embodiment, air vibration may be caused when the user speaks, so that the bone conduction signal collected by the bone conduction sensor usually contains noise signals such as a self-voice component transmitted through air. To this end, this embodiment may perform noise reduction processing on the bone conduction signal collected by the bone conduction sensor to obtain the noise-reduced bone conduction signal.

Specifically, in this embodiment, in order to perform noise reduction processing on the bone conduction signal collected by the bone conduction sensor, a neural network adaptive filter may be used to achieve the noise reduction processing. First, a trained neural network adaptive filter can be obtained through a cloud server, and it can be understood that the training process of the neural network adaptive filter is completed by the cloud server, and the earphones can perform filtering processing on the bone conduction signal using the trained neural network adaptive filter issued by the cloud server.

In this embodiment, the earphones use the trained neural network adaptive filter to perform the filtering processing on the bone conduction signal collected by the bone conduction sensor, based on the microphone signal as a reference signal, to reduce the self-voice component transmitted through air in the bone conduction signal. It will be understood that, filtering the bone conduction signal through the neural network adaptive filter may reduce the self-voice component transmitted through air in the bone conduction signal. Therefore, the similarity between the filtered bone conduction signal and a sound transmitted to the ear canal through a user's skeletons is higher, so that it has a better effect of eliminating sound transmitted to the ear canal through a user's skeletons from the bone conduction signal based on the principle of co-frequency interference.

In order to further explain the operating principle of the neural network adaptive filter, a detailed explanation of the training process of the neural network adaptive filter will be provided in the embodiments of the present disclosure. In order to train a blank neural network adaptive filter model, at first, a training set containing training data need to be obtained. The training set includes a microphone signal collected by the microphone based on air conduction, and a corresponding bone conduction signal before noise reduction and a bone conduction signal after noise reduction. Here, the bone conduction signal before noise reduction is a bone conduction signal collected by the bone conduction sensor, and the bone conduction signal after noise reduction is a bone conduction signal obtained by reducing the self-voice component transmitted through air in the bone conduction signal before noise reduction. That is, in the embodiment, the microphone signal and the corresponding bone conduction signal before noise reduction and bone conduction signal after noise reduction are a group of training data. In the embodiment, in order to collect each group of training data, the corresponding bone conduction signal can be collected through the worn bone conduction sensor while the microphone signal is collected, and then noise reduction can be performed on the bone conduction signal, to obtain the bone conduction signal after noise reduction, thereby obtaining a corresponding set of training data. It will be understood that, in order to ensure the filtering effect of the trained neural network adaptive filter, the number of groups of training data contained in the training set should be large enough to ensure that the trained neural network adaptive filter can better reduce the noise component transmitted through air in the bone conduction signal before noise reduction.

In the embodiment, when training the blank neural network adaptive filter model, it needs to take the microphone signal and the bone conduction signal before noise reduction in the training set as input side training data, and take the bone conduction signal after noise reduction in the training set as output side training data, to obtain the trained neural network adaptive filter, so that the trained neural network adaptive filter can subsequently use the microphone signal to eliminate the noise component transmitted through air in the bone conduction signal before noise reduction, and thereby obtaining the noise-reduced bone conduction signal.

S23: performing phase adjustment on the bone conduction signal after noise reduction to obtain an adjusted bone conduction signal.

S24: processing an audio stream containing the adjusted bone conduction signal and the microphone signal based on a hearing impairment compensation algorithm and/or a speech enhancement algorithm.

S25: inputting the audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to the ear canal through a user's skeletons.

In the embodiment, regarding the specific processes of the above-mentioned steps S23, S24, and S25, reference may be made to the corresponding content disclosed in the foregoing embodiments, which will not be described again here.

It can be seen that, in the embodiment of the present disclosure, a bone conduction signal when the earphones are in worn states is collected by a bone conduction sensor, and noise reduction processing is performed on the bone conduction signal collected by the bone conduction sensor to obtain the noise-reduced bone conduction signal. The noise reduction processing on the bone conduction signal can be specifically achieved through a neural network adaptive filter. Thus, at first, the trained neural network adaptive filter is acquired through a cloud server, and the trained neural network adaptive filter is used to filter the bone conduction signal collected by the bone conduction sensor to reduce a self-voice component transmitted through air in the bone conduction signal, and then phase adjustment is performed on the bone conduction signal to obtain an adjusted bone conduction signal. Then, an audio stream containing the adjusted bone conduction signal and the microphone signal is processed based on a hearing impairment compensation algorithm and/or a speech enhancement algorithm, and finally, the audio stream, which contains the adjusted bone conduction signal and the microphone signal, is input into an audio playing unit of the earphones to play the audio stream, so that co-channel interference is generated between the adjusted bone conduction signal in the audio stream and a sound which is transmitted to the ear canal through a user's skeletons. The above method can effectively reduce or even eliminate the sound transmitted to the ear canal through a user's skeletons, so that the user can better hear the environmental sounds, and thereby improving the user's using experience.

Figure 4:
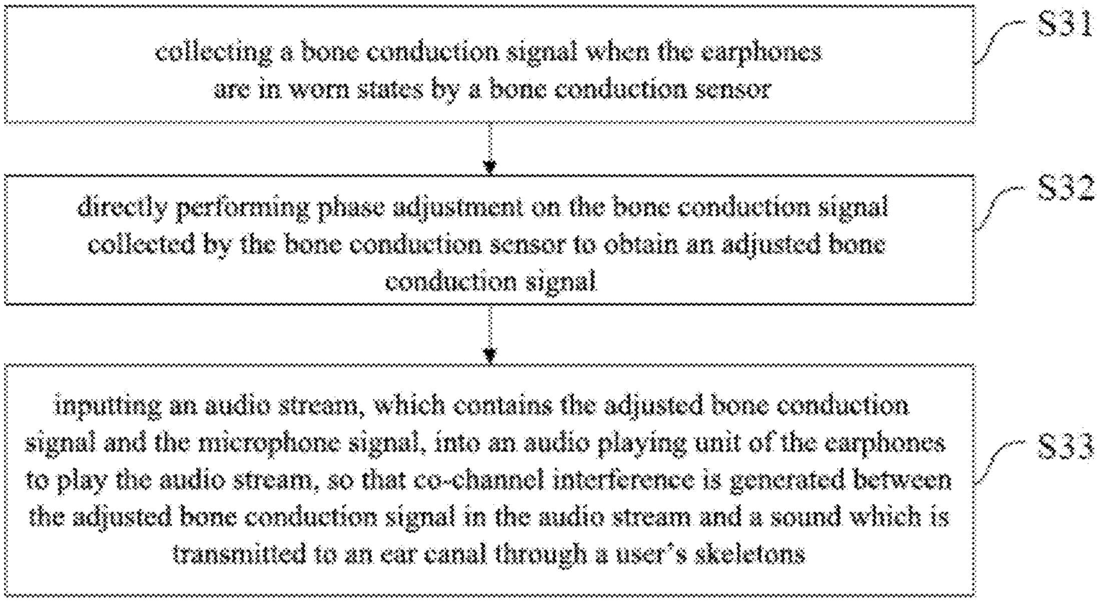
FIG. 4 is a flow chart of a specific audio processing method for earphones provided by the present disclosure.

FIG. 4 is a flow chart of a specific audio processing method for earphones provided by the present disclosure. Referring to FIG. 4, the audio processing method for earphones includes:

S31: collecting a bone conduction signal when the earphones are in worn states by a bone conduction sensor.

S32: directly performing phase adjustment on the bone conduction signal collected by the bone conduction sensor to obtain an adjusted bone conduction signal.

S33: inputting an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons.

In the embodiment, air vibration may be caused when the user speaks, so that the bone conduction signal collected by the bone conduction sensor usually contains noise signals such as a self-voice component transmitted through air. However, since the noise signals account for a small proportion of the bone conduction signal, in an application scenario where internal computing resources of the earphones are relatively lacking, in order to reduce the computing pressure, the embodiment may choose not to perform noise reduction processing on the bone conduction signal collected by the bone conduction sensor, and instead directly perform phase adjustment on the bone conduction signal to obtain an adjusted bone conduction signal. It can be understood that, the adjusted bone conduction signal can weaken part of the sound transmitted to the ear canal through a user's skeletons in the ear canal of the user.

In the embodiment, a bone conduction signal when the earphones are in worn states is collected by a bone conduction sensor, then phase adjustment is directly performed on the bone conduction signal collected by the bone conduction sensor to obtain an adjusted bone conduction signal, and finally, an audio stream, which contains the adjusted bone conduction signal and the microphone signal, is input into an audio playing unit of the earphones to play the audio stream, so that co-channel interference is generated between the adjusted bone conduction signal in the audio stream and a sound which is transmitted to an ear canal through a user's skeletons. The embodiment not only simplifies the steps of signal processing, but also effectively weakens the sound transmitted to the ear canal through a user's skeletons.

Figure 5:
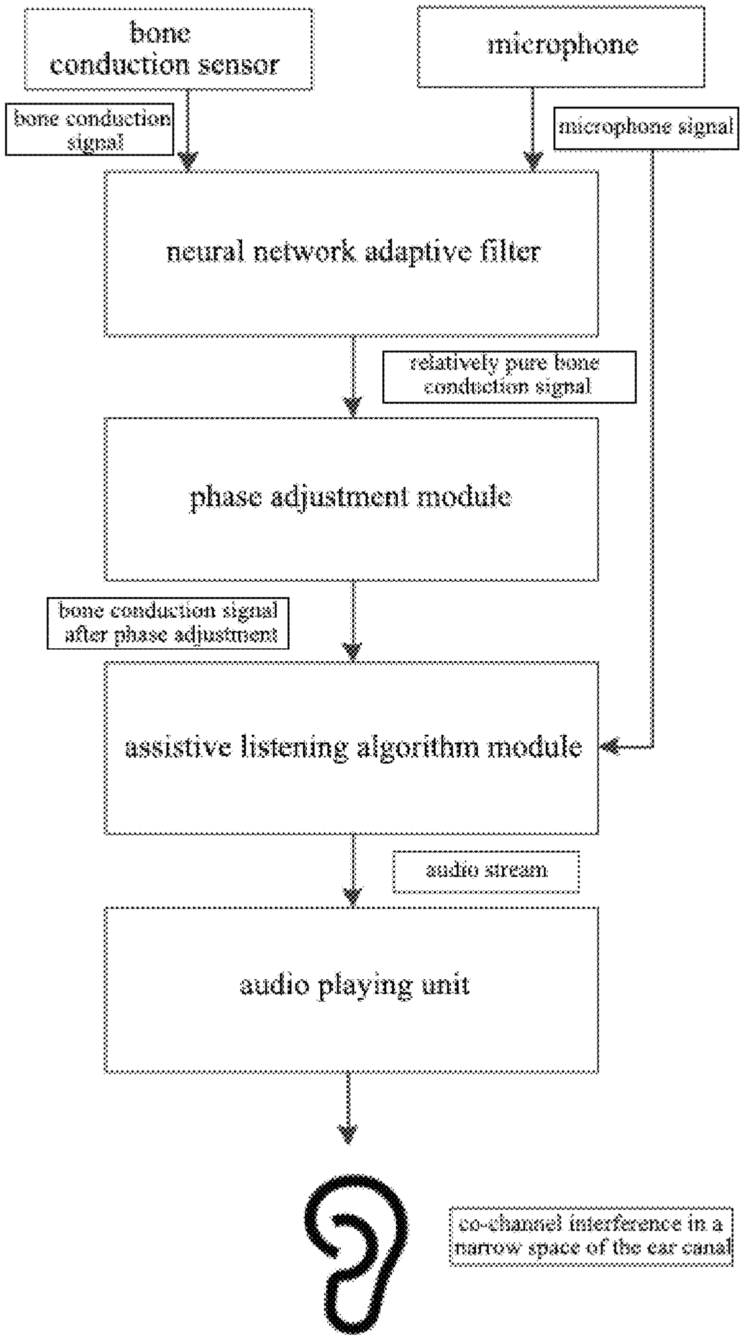
FIG. 5 is a schematic diagram of a specific audio processing method for earphones provided by the present disclosure.

In order to further explain the audio processing method for earphones, the embodiment of the present disclosure also provides a specific audio processing method for earphones, as illustrated in schematic diagram of FIG. 5.

When the user speaks while wearing the earphones, a bone conduction sensor in the earphones collects a bone conduction signal transmitted through the teeth, gums, and skeleton such as upper and lower jaw bones due to the user speaking, in the meanwhile, a microphone collects a microphone signal transmitted through air, and then the bone conduction signal and the microphone signal are input into a neural network adaptive filter in the earphones, so that the neural network adaptive filter uses the microphone signal as a reference signal to reduce a self-voice component transmitted through air in the bone conduction signal so as to obtain a relatively pure bone conduction signal. It can be understood that, in practical applications, after the self-voice component transmitted through air is removed through the neural network adaptive filter from the bone conduction signal, there may still be a certain noise signal, and since the similarity between the filtered bone conduction signal and a sound transmitted to the ear canal through a user's skeletons meets a preset standard, such a noise signal can be ignored. Then, reverse phase adjustment is performed on the filtered bone conduction signal to obtain an adjusted bone conduction signal, and an audio stream containing the adjusted bone conduction signal and the microphone signal is processed based on an assistive listening algorithm module, wherein, the assistive listening algorithm module includes a hearing impairment compensation unit and/or a speech enhancement unit. Finally, the audio stream, which contains the adjusted bone conduction signal and the microphone signal, is input into an audio playing unit of the earphones to play the audio stream, so that co-channel interference is generated in the ear canal of the user between the adjusted bone conduction signal in the audio stream and a sound which is transmitted to the ear canal through a user's skeletons, thereby weakening the sound transmitted to the ear canal through a user's skeletons, so that the user can better hear the environmental sounds when the user speaks while wearing the earphones, and thereby effectively improving the user's using experience.

Figure 6:
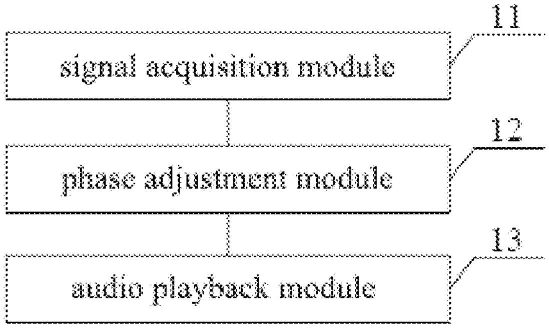
FIG. 6 is a schematic diagram of the structure of an audio processing apparatus for earphones provided by the present disclosure.

Referring to FIG. 6, the embodiment of the present disclosure also discloses an audio processing apparatus for earphones, including:

- a signal acquisition module 11 for acquiring a bone conduction signal and a microphone signal when the earphones are in worn states;
- a phase adjustment module 12 for performing phase adjustment on the bone conduction signal to obtain an adjusted bone conduction signal; and
- an audio playback module 13 for inputting an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons.

It can be seen that, the embodiment of the present disclosure is configured to acquire a bone conduction signal and a microphone signal when the earphones are in worn states at first, then perform phase adjustment on the bone conduction signal to obtain an adjusted bone conduction signal, and finally input an audio stream, which contains the adjusted bone conduction signal and the microphone signal, into an audio playing unit of the earphones to play the audio stream, so that co-channel interference is generated between the adjusted bone conduction signal in the audio stream and a sound which is transmitted to an ear canal through a user's skeletons. By playing an audio stream containing the adjusted bone conduction signal, co-channel interference is generated in the ear canal of the user between the adjusted bone conduction signal and a sound which is transmitted to an ear canal through a user's skeletons due to the same frequency and a certain phase difference between the adjusted bone conduction signal and the sound, as a result, reducing the sound transmitted to the ear canal through a user's skeletons in the ear canal of the user, thereby improving the user's using experience.

In some implementations, the signal acquisition module 11 specifically includes:

- a bone conduction signal acquisition sub-module for collecting a bone conduction signal when the earphones are in worn states by a bone conduction sensor; and
- a bone conduction signal noise reduction sub-module for performing noise reduction processing on the bone conduction signal collected by the bone conduction sensor to obtain a noise-reduced bone conduction signal.

In some implementations, the phase adjustment module 12 specifically includes:

- a first phase adjustment unit for performing phase adjustment on the noise-reduced bone conduction signal;
- a second phase adjustment unit for directly performing phase adjustment on the bone conduction signal collected by the bone conduction sensor; and
- a third phase adjustment unit for performing a reversed phase processing on the bone conduction signal to obtain an adjusted bone conduction signal.

In some implementations, the bone conduction signal noise reduction sub-module specifically includes:

- a filter acquisition sub-module for acquiring a trained neural network adaptive filter through a cloud server; and
- a signal filtering sub-module for performing filtering processing on the bone conduction signal collected by the bone conduction sensor by using the trained neural network adaptive filter to reduce a self-voice component transmitted through air in the bone conduction signal.

In some implementations, the cloud server specifically includes:

- a training set acquisition module for acquiring a training set; the training set includes a pre-collected microphone signal and a corresponding bone conduction signal before noise reduction and a bone conduction signal after noise reduction; the bone conduction signal before noise reduction is a bone conduction signal collected by the bone conduction sensor; the bone conduction signal after noise reduction is a bone conduction signal obtained by reducing the self-voice component transmitted through air in the bone conduction signal before noise reduction; and a filter training module for training the neural network adaptive filter by using the microphone signal and the bone conduction signal before noise reduction in the training set as input side training data and using the bone conduction signal after noise reduction in the training set as output side training data, to obtain the trained neural network adaptive filter.

In some implementations, the audio processing method for earphones further includes:

an audio stream processing module for processing the audio stream based on a hearing impairment compensation algorithm and/or a speech enhancement algorithm.

Figure 7:
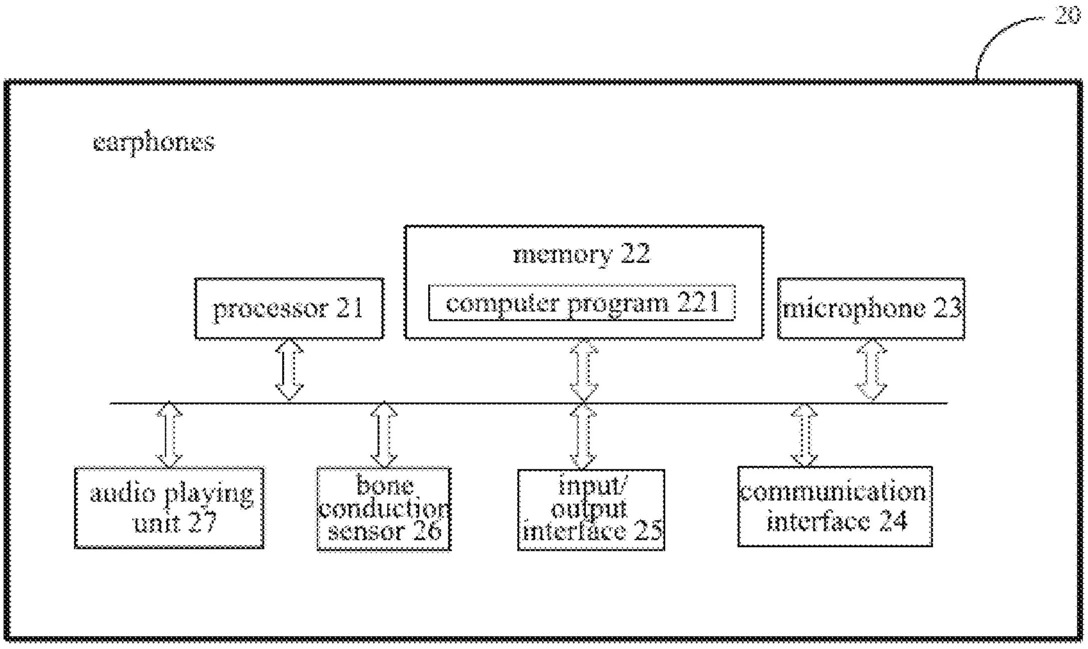
FIG. 7 is a diagram of the structure of earphones provided by the present disclosure.

Furthermore, the embodiment of the present disclosure further provides earphones. FIG. 7 is a diagram of the structure of earphone 20 according to an exemplary embodiment. The content in the figure cannot be considered as any limitation on the scope of use of the present disclosure.

FIG. 7 is a diagram of the structure of earphones provided by the present disclosure. The earphone 20 may specifically include: at least one processor 21, at least one memory 22, a microphone 23, a communication interface 24, an input/output interface 25, a bone conduction sensor 26, and an audio playing unit 27. Herein, the memory 22 is used to store a computer program, and the computer program is loaded and executed by the processor 21 to implement relevant steps in the audio processing method for earphones disclosed in any of the foregoing embodiments.

In the embodiment, the communication interface 24 can provide a data transmission channel between the earphone 20 and an external device, and a communication protocol it follows is any communication protocol that can be applied to the technical solutions of the present disclosure, which is not specifically limited here. The input/output interface 25 is used to acquire external input data or output data to the outside, a specific interface type thereof can be selected according to specific application requirement and is not specifically limited here.

In addition, the memory 22, as a carrier for resource storage, may be a read-only memory, a random access memory, a magnetic disk or an optical disk, etc. The resources stored therein may include a computer program 221, and the storage method thereof may be short-term storage or permanent storage.

Wherein, in addition to computer programs that can be used to complete computer programs of the audio processing method for earphones executed by the earphone 20 disclosed in any of the foregoing embodiments, the computer program 221 may further include computer programs that can be used to complete other specific tasks.

Furthermore, the embodiment of the present disclosure also discloses a storage medium, in which a computer program is stored, wherein when the computer program is loaded and executed by a processor, steps of the audio processing method for earphones disclosed in any of the foregoing embodiments can be implemented.

The various embodiments in the present specification are described in a progressive manner, and each embodiment focuses on the differences from other embodiments, and the same and similar parts between the various embodiments can be referred to each other. As for the apparatus disclosed in the embodiment, since it corresponds to the method disclosed in the embodiment, the description is relatively simple. For relevant parts, please refer to the description of the method.

It should be noted that relational terms such as first and second described herein are only used to distinguish one entity or operation from another entity or operation, and do not necessarily require or imply any such actual relationship or order between these entities or operations. Moreover, terms such as "include", "include" or any other variation therefor are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "including a . . . " does not preclude the presence of additional identical elements in the process, method, article or apparatus including the element.

The earphones and an audio processing method and apparatus therefor, and a storage medium provided by the present application have been introduced in detail above. Specific examples are used herein to illustrate the principles and implementations of the present disclosure. The description of the above embodiments is only used to help understanding the method of the disclosure and its core idea. And, for those of ordinary skill in the art, there will be changes in specific implementations and application scopes based on the idea of the present disclosure. In conclusion, the contents of the specification should not be understood as a limitation on the present application.

What is claimed is:

1. An audio processing method for earphones, comprising:

acquiring a bone conduction signal and a microphone signal when the earphones are in worn states;

performing phase adjustment on the bone conduction signal to obtain an adjusted bone conduction signal; and inputting an audio stream, which includes the adjusted bone conduction signal and the microphone signal, into an audio playing apparatus of the earphones to play the audio stream, so that co-channel interference is generated between the adjusted bone conduction signal in the audio stream and a sound which is transmitted to an ear canal through a user's skeletons, wherein the acquiring the bone conduction signal when the earphones are in worn states comprises:

collecting the bone conduction signal when the earphones are in worn states by a bone conduction sensor, and performing noise reduction processing on the bone conduction signal collected by the bone conduction sensor to obtain a noise-reduced bone conduction signal, wherein the performing noise reduction processing on the bone conduction signal collected by the bone conduction sensor comprises acquiring a trained neural network adaptive filter through a cloud server, and wherein the acquiring the trained neural network adaptive filter comprises:

acquiring a training set, wherein the training set comprises a pre-collected microphone signal and a corresponding bone conduction signal before noise reduction and a bone conduction signal after noise reduction, the bone conduction signal before noise reduction is a bone conduction signal collected by the bone conduction sensor, and the bone conduction signal after noise reduction is a bone conduction signal obtained by reducing a self-voice component transmitted through air in the bone conduction signal before noise reduction, and training the neural network adaptive filter by using the microphone signal and the bone conduction signal before noise reduction in the training set as input side training data and by using the bone conduction signal after noise reduction in the training set as output side training data, to obtain the trained neural network adaptive filter.

2. The audio processing method for earphones of claim 1, wherein the performing phase adjustment on the bone conduction signal comprises performing phase adjustment on the noise-reduced bone conduction signal.

3. The audio processing method for earphones of claim 2, wherein the performing noise reduction processing on the bone conduction signal collected by the bone conduction sensor further comprises performing filtering processing on the bone conduction signal collected by the bone conduction sensor by using the trained neural network adaptive filter, to reduce a self-voice component transmitted through air in the bone conduction signal.

4. The audio processing method for earphones of claim 1, wherein the performing phase adjustment on the bone conduction signal comprises directly performing phase adjustment on the bone conduction signal collected by the bone conduction sensor.

5. The audio processing method for earphones of claim 1, wherein the performing phase adjustment on the bone conduction signal to obtain an adjusted bone conduction signal comprises performing a reversed phase processing on the bone conduction signal to obtain an adjusted bone conduction signal.

6. The audio processing method for earphones of claim 1, further comprising, before the inputting the audio stream, which includes the adjusted bone conduction signal and the microphone signal, into an audio playing apparatus of the earphones to play the audio stream, processing the audio stream based on a hearing impairment compensation algorithm and/or a speech enhancement algorithm.

7. An earphone, comprising a processor and a memory, wherein the memory is used to store a computer program, and the computer program is loaded and executed by the processor to implement the audio processing method for earphones of claim 1.

8. A non-transitory computer-readable storage medium, for storing a computer-executable instruction, wherein when the computer-executable instruction is loaded and executed by a processor, the audio processing method for earphones of claim 1 is implemented.

* * * * *